(12) United States Patent
Kim

(10) Patent No.: US 9,909,025 B2
(45) Date of Patent: Mar. 6, 2018

(54) THERMOCHROMIC MICRO PARTICLES AND THERMOCHROMIC INK COMPOSITION, WRITING APPARATUS AND SMART WINDOW USING THE SAME

(71) Applicant: Dong-A Pencil Co., Ltd., Seoul (KR)

(72) Inventor: Hak Jae Kim, Daejeon (KR)

(73) Assignee: Dong-A Pencil Co., Ltd., Seoul (KR)

(*) Notice: Subject to any disclaimer, the term of this patent is extended or adjusted under 35 U.S.C. 154(b) by 0 days.

(21) Appl. No.: 15/186,253

(22) Filed: Jun. 17, 2016

(65) Prior Publication Data
US 2016/0376457 A1   Dec. 29, 2016

(30) Foreign Application Priority Data

Jun. 26, 2015 (KR) .................. 10-2015-0091149
Apr. 20, 2016 (KR) .................. 10-2016-0048341

(51) Int. Cl.
*B41M 5/28* (2006.01)
*B41M 5/333* (2006.01)
(Continued)

(52) U.S. Cl.
CPC .............. *C09D 11/50* (2013.01); *B41M 5/284* (2013.01); *B41M 5/287* (2013.01); *B41M 5/3333* (2013.01); *B41M 5/3335* (2013.01); *B43K 7/02* (2013.01); *B43K 8/03* (2013.01); *C09D 11/17* (2013.01); *C09D 163/00* (2013.01); *C09K 9/02* (2013.01); *E06B 9/24* (2013.01); *E06B 2009/2417* (2013.01)

(58) Field of Classification Search
CPC ........ B41M 5/28; B41M 5/282; B41M 5/284; B41M 5/287; B41M 5/333; B41M 5/3333; B41M 5/3335; C09D 11/50

USPC ......................... 503/201, 216, 217
See application file for complete search history.

(56) References Cited

U.S. PATENT DOCUMENTS

| 4,028,118 A | 6/1977 | Norikazu et al. |
| 6,586,364 B2 * | 7/2003 | Kubota .................. B41M 5/287 428/321.5 |
| 2015/0090159 A1 | 4/2015 | Wang et al. |

FOREIGN PATENT DOCUMENTS

| CN | 103788939 A | 5/2014 |
| JP | 2004-027048 A | 1/2004 |

(Continued)

OTHER PUBLICATIONS

Extended European Search Report dated Oct. 5, 2016, which issued in European Application No. 16174664.9.

(Continued)

*Primary Examiner* — Bruce H Hess
(74) *Attorney, Agent, or Firm* — McDermott, Will & Emery LLP

(57) ABSTRACT

The present invention relates to thermochromic micro particles capable of stably implementing a high chromogenic property and a decolorization property and having an improved erasing property, thermal resistance, and chemical resistance, and a thermochromic ink composition, a writing apparatus, and a smart window using the same. The thermochromic micro particles comprise a core part including a phase change material and a dye, the phase change material including a phenol-based compound containing an aliphatic functional group having a carbon number of 6 or more; and a shell layer including a polymer resin.

14 Claims, 6 Drawing Sheets

(51) Int. Cl.
*C09D 11/50* (2014.01)
*C09K 9/02* (2006.01)
*C09D 11/17* (2014.01)
*C09D 163/00* (2006.01)
*E06B 9/24* (2006.01)
*B43K 7/02* (2006.01)
*B43K 8/03* (2006.01)

(56) References Cited

FOREIGN PATENT DOCUMENTS

| | | |
|---|---|---|
| JP | 2006-063238 A | 3/2006 |
| JP | 2006-117805 A | 5/2006 |
| JP | 2009-091475 A | 4/2009 |
| WO | WO-2012/115121 A1 | 8/2012 |

OTHER PUBLICATIONS

Naito, "Rewritable color recording media consisting of leuco dye and biphenyl developer with a long alkyl chain," J Mater. Chem., 1998, vol. 8, No. 6, pp. 1379-1384.

Seeboth et al., "Thermotropic and Thermochromic Polymer Based Materials for Adaptive Solar Control," Materials, 2010, No. 3, pp. 5143-5168.

* cited by examiner

THERMOCHROMIC MICRO PARTICLES AND THERMOCHROMIC INK COMPOSITION, WRITING APPARATUS AND SMART WINDOW USING THE SAME

CROSS-REFERENCE TO RELATED APPLICATION

This application claims the benefit of priority to Korean Patent Application No. 10-2015-0091149 filed in the Korean Intellectual Property Office on Jun. 26, 2015 and Korean Patent Application No. 10-2016-0048341 filed in the Korean Intellectual Property Office on Apr. 20, 2016, the entire contents of which are incorporated herein by reference.

TECHNICAL FIELD OF THE INVENTION

The present invention relates to thermochromic micro particles, and a thermochromic ink composition, a writing apparatus, and a smart window using the same. More specifically, the present invention relates to thermochromic micro particles capable of stably implementing a high chromogenic (color development) property and a decolorization property depending on a temperature change, and having an improved erasing property, thermal resistance, and chemical resistance, and a thermochromic ink composition, a writing apparatus, and a smart window using the same.

BACKGROUND OF THE INVENTION

In general, an ink for writing is divided into a water-based ink and an oil-based ink, and is absorbed or attached to settle onto writing surfaces to maintain a state in which the ink is written for a long period of time. The water-based ink and the oil-based ink for writing are absorbed or attached onto the writing surfaces (for example, a paper, a synthetic resin, etc.), to settle, and are not easily removed.

In a written document employing a writing apparatus using the water-based ink and the oil-based ink for writing, if it happens to require modification of a text or correction of typographical error, the written document needs to be erased, but is not clearly erased with an eraser for general pencil. Further, if it attempts to erase the document with an eraser for a ballpoint pen, a surface settled with the water-based ink and the oil-based ink is ground and ripped off, such that a paper may be torn or deformed.

Accordingly, a technology of manufacturing an ink by using a material having a color-change property in which a colorless compound shows colors, or reversely, a colored compound is changed into colorless by external stimulus, has been recently suggested. The external stimulus may include heat, light, pressure, etc. Particularly, a research into a technology of securing an erasing property of an ink by using a thermochromic compound showing the color-change property in which colorless is implemented from color when applying heat, has been actively conducted.

However, in the thermochromic material in which color-change is performed at a relatively high temperature, there is a limitation in that portability is not satisfied since heating apparatuses such as a hair dryer, hot water, etc., are required to erase the ink.

In addition, in the case of using a material in which thermochromism is possible by body heat, frictional heat due to an eraser, etc., there is a limitation in that a chromogenic property is not sufficiently maintained, for example, color-change is performed even at a summer temperature, etc.

Therefore, development of a thermochromic compound having a color-change temperature range, capable of being rapidly erased by an erasing method with simplicity and portability, while maintaining an excellent chromogenic property has been demanded.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide thermochromic micro particles having advantages of stably implementing a high chromogenic property and a decolorization property and having an improved erasing property, thermal resistance, and chemical resistance.

In addition, the present invention has been made in an effort to provide a thermochromic ink composition, a writing apparatus, and a smart window using the thermochromic micro particles.

An exemplary embodiment of the present invention provides thermochromic micro particles including: a core part including a phase change material and a dye, the phase change material including a phenol-based compound containing an aliphatic functional group having a carbon number of 6 or more; and a shell layer including a polymer resin.

In addition, another exemplary embodiment of the present invention provides a thermochromic ink composition including the thermochromic micro particles as described above.

Further, still another exemplary embodiment of the present invention provides a thermochromic writing apparatus including an ink storage container filled with the thermochromic ink composition as described above.

In addition, yet another exemplary embodiment of the present invention provides a smart window including a coating layer in which the thermochromic micro particles as described above are dispersed.

DETAILED DESCRIPTION OF THE INVENTION

Figure 1:
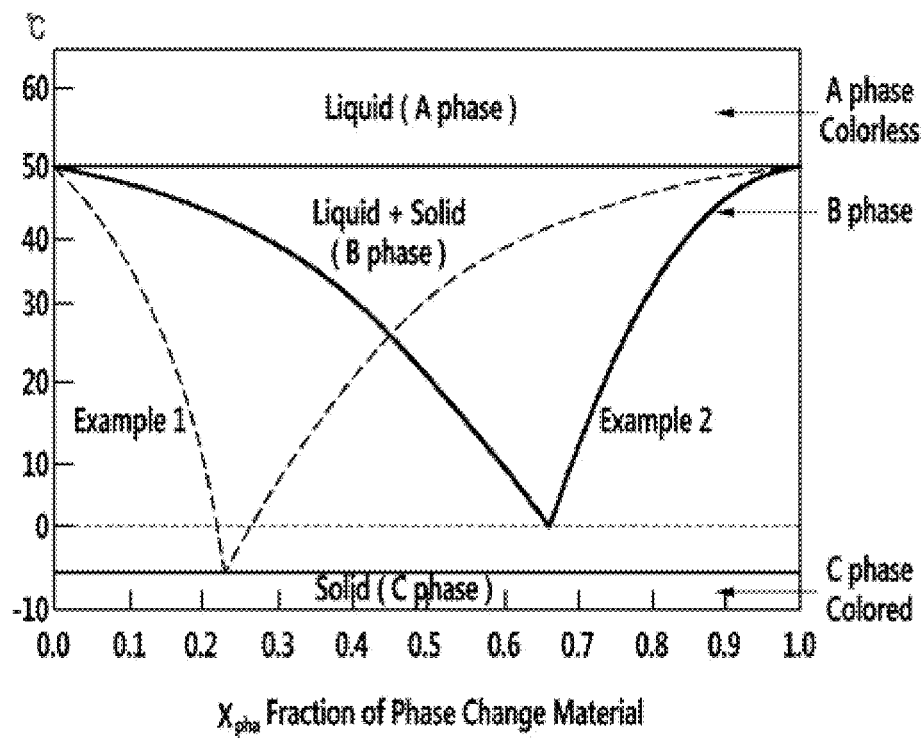
FIG. 1 shows a phase change characteristic of thermochromic micro particles of Examples.

Hereinafter, thermochromic micro particles, and a thermochromic ink composition, a writing apparatus, and a smart window using the same according to specific exemplary embodiment of the present invention are described in more detail.

According to an embodiment of the present invention, there may be provided thermochromic micro particles including: a core part including a phase change material and a dye, the phase change material including a phenol-based compound containing an aliphatic functional group having a carbon number of 6 or more; and a shell layer including a polymer resin.

The present inventors confirmed through experiments that when the above-described thermochromic micro particles are used, a decolorization property could be implemented depending on a temperature change while exhibiting a high chromogenic property, and a temperature range at which thermochromism is performed by the phase change material could be controlled, such that the decolorization property and the chromogenic property could be easily maintained and the thermochromic micro particles could be rapidly erased by an erasing method with simplicity and portability, and completed the present invention.

In addition, the phase change material included in the thermochromic micro particles has a chemical structure that a role of the existing developer used for color-developing the dye is capable of being performed while simultaneously functioning as the phase change material, such that it is unnecessary to separately add the developer to the thermochromic micro particles.

In addition, when the above-described thermochromic micro particles are used, deterioration of function may be prevented and heat stability may be secured despite contacting chemical active materials such as acid materials, basic materials, peroxides, etc., or other solvent components.

The thermochromic micro particles according to the exemplary embodiment of the present invention may be utilized in various fields that thermochromism property is required, for example, an ink composition, an ink, a pen, a coating composition, a fiber, a construction material, etc.

In particular, the thermochromic micro particles may include the phase change material. The phase change material is a material absorbing and storing latent heat as the phase is changed from solid to liquid or from liquid to gas depending on a phase change temperature, and may store or release heat through chemical bond.

The phase change material (PCM) may include the phenol-based compound including an aliphatic functional group having a carbon number of 6 or more. The phenol-based compound may include a phenol compound or a polyphenol compound and the respective derivative compounds thereof. The polyphenol compound may mean a compound including at least 2 hydroxy groups.

The phenol-based compound may include an aliphatic functional group having a carbon number of 6 or more. The aliphatic functional group having a carbon number of 6 or more may include a straight chain or branched chain alkyl group having a carbon number of 6 to 50, or 10 to 40.

The phenol-based compound including the aliphatic functional group having a carbon number of 6 or more may include a phenol-based compound including an aromatic ring having a carbon number of 6 to 20 and substituted with at least one hydroxy group, and an aliphatic functional group having a carbon number of 6 or more. The phenol-based compound including the aliphatic functional group having a carbon number of 6 or more may implement phase-change characteristic by the aliphatic functional group having a carbon number of 6 or more, and simultaneously implement a chromogenic property of a lactone-based dye by the aromatic ring having a carbon number of 6 to 20 and substituted with at least one hydroxy group.

That is, since the phenol-based compound including the aliphatic functional group having a carbon number of 6 or more may be the phase change material while simultaneously functioning as the developer, such that it is unnecessary to separately add the developer to the thermochromic micro particles.

The aromatic ring having a carbon number of 6 to 20 and substituted with at least one hydroxy group may include an aromatic ring having a carbon number of 6 to 15 and substituted with at least one hydroxy group, or an aromatic ring having a carbon number of 6 to 20 and substituted with at least 3 hydroxy groups.

More specifically, the phenol-based compound including the aliphatic functional group having a carbon number of 6 or more may include a compound represented by Chemical Formula 1 below:

[Chemical Formula 1]

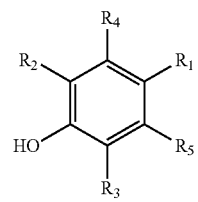

in Chemical Formula 1, at least one of $R_1$ to $R_5$ may be a functional group including an aliphatic functional group having a carbon number of 6 or more, and the others may be each independently a hydroxy group or hydrogen.

More specifically, in Chemical Formula 1, $R_1$ may be a carbonyl functional group combined with an aliphatic functional group having a carbon number of 6 or more or an aromatic functional group combined with an aliphatic functional group having a carbon number of 6 or more, and $R_2$ to $R_5$ may be each independently a hydroxy group or hydrogen.

The carbonyl functional group combined with an aliphatic functional group having a carbon number of 6 or more may include a functional group represented by Chemical Formula 2 below:

[Chemical Formula 2]

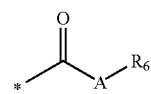

in Chemical Formula 2, $R_6$ is a straight chain or branched chain alkyl group having a carbon number of 6 to 20, and A is a direct bond, oxygen, nitrogen, or sulfur. Specifically, $R_6$ may be a straight chain alkyl group having a carbon number of 1 to 20, or a branched chain alkyl group having a carbon number of 4 to 20.

In Chemical Formula 2, may mean a direct bond. In addition, the aromatic functional group combined with an aliphatic functional group having a carbon number of 6 or more may include a functional group represented by Chemical Formula 3 below:

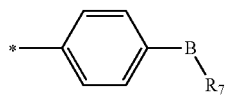

[Chemical Formula 3]

in Chemical Formula 3, $R_7$ is a straight chain or branched chain alkyl group having a carbon number of 6 to 20, and B is a direct bond, oxygen, nitrogen, or sulfur. Specifically, $R_7$ may be a straight chain alkyl group having a carbon number of 1 to 20, or a branched chain alkyl group having a carbon number of 4 to 20. In Chemical Formula 3, '*' may mean a direct bond.

Preferably, in Chemical Formula 1, $R_1$ may be a functional group represented by Chemical Formula 2, and all of $R_2$ to $R_5$ may be hydrogen, and $R_1$ may be an aromatic functional group represented by Chemical Formula 3, and $R_2$ to $R_3$ may be a hydroxy group, and $R_4$ to $R_5$ may be hydrogen.

Specific examples of the phenol-based compound including an aliphatic functional group having a carbon number of 6 or more may include lauryl gallate, 4-alkoxy-4'-hydroxybiphenyl, etc.

In the thermochromic micro particles, a color-change temperature range defined by General Formula 1 below may be 50° C. or more. Accordingly, thermochromism of the dye may be controlled, such that the thermochromic micro particles may be rapidly erased by an erasing method with simplicity, while maintaining an excellent chromogenic property. Specifically, in the thermochromic micro particles, the color-change temperature range defined by General Formula 1 below is 50° C. or more, which is large, such that a phase change zone in which a solid phase and a liquid phase of the phase change material coexist widens, and accordingly, it is easy to maintain a chromogenic state and a decolorization state before and after the color-change, respectively.

Color-change temperature range ($\Delta T$)=an absolute value of a difference between a melting point of the phase change material and a crystallization temperature of the phase change material. [General Formula 1]

The melting temperature (Tm) is a temperature when a state change from solid to liquid is generated, and specifically means the lowest temperature at which the phase change material is capable of being present as a complete liquid state. In addition, the crystallization temperature (Tc) means a temperature at which crystallization is generated, or a heat treatment temperature required for crystallization, and specifically means the highest temperature at which the phase change material is capable of being present as a complete solid state.

The phase change material may have the crystallization temperature of −20° C. to 0° C., or −10° C. to 5° C. In addition, the phase change material may have a melting point of 30° C. or more, 40° C. or more, or 50° C. or more.

Further, the thermochromic micro particle may include a dye. The dye may be a lactone-based dye, wherein the lactone-based dye is leuco dye, and may exhibit thermochromism property. Examples of the lactone-based dye may include a phthalide-based compound or a fluoran-based compound, etc.

The phthalide-based compound may include phthalide compounds or derivative compounds thereof, and the fluoran-based compound may include fluoran compounds or derivative compounds thereof.

Examples of the phthalide-based compound may include diphenylmethane phthalide-based compounds, phenyl indolyl phthalide-based compounds, indolyl phthalide-based compounds, diphenylmethane azaphthalide-based compound, etc.

More specifically, examples of the lactone-based dye may include 3,3-bis(p-dimethylamino phenyl)-6-dimethylamino phthalide, 3-(4-diethylamino phenyl)-3-(1-ethyl-2-methyl-indol-3-yl)phthalide, 3,3-bis(1-n-butyl-2-methylindol-3-yl) phthalide, 3,3-bis(2-ethoxy-4-diethyl amino phenyl)-4-azaphthalide, 3-[2-ethoxy-4-(N-ethyl anilino)phenyl]-3-(1-ethyl-2-methylindol-3-yl)-4-azaphthalide, 3,6-diphenyl amino fluoran, 3,6-dimethoxy fluoran, 3,6-di-n-butoxy fluoran, 2-methyl-6-(N-ethyl-N-p-tril amino) fluoran, 3-chloro-6-cyclohexylamino fluoran, 2-methyl-6-cyclohexylamino fluoran, 2-(2-chloro anilino)-6-di-n-butyl amino fluoran, 2-(3-trifluoromethyl anilino)-6-diethyl amino fluoran, 2-(N-methylanilino)-6-(N-ethyl-N-p-tril amino) fluoran, 1,3-dimethyl-6-diethyl amino fluoran, 2-chloro-3-methyl-6-diethyl aminofluoran, 2-anilino-3-methyl-6-diethyl amino fluoran, 2-anilino-3-methyl-6-di-n-butyl amino fluoran, 2-xylidino3-methyl-6-diethyl amino fluoran, 1,2-benz-6-diethyl amino fluoran, 1,2-benz-6-(N-ethyl-N-isobutyl amino) fluoran, 1,2-benz-6-(N-ethyl-N-isoamyl amino) fluoran, spiro[5H-(1) benzopyrano(2,3-d) pyrimidine-5,1'(3'H) isobenzofuran]-3'-one,2-(diethyl amino)-8-(diethylamino)-4-methyl-, spiro[5H-(1) benzopyrano(2,3-d) pyrimidine-5,1' (3'H) isobenzofuran]-3'-one,2-(di-n-butylamino)-8-(di-n-butyl amino)-4-methyl-, spiro[5H-(1) benzopyrano(2,3-d) pyrimidine-5,1'(3'H) isobenzofuran]-3-one,2-(di-n-butyl amino)-8-(diethyl amino)-4-methyl-, spiro[5H-(1) benzopyrano(2,3-d) pyrimidine-5,1'(3'H) isobenzofuran]-3'-one,2-(di-n-butyl amino)-8-(N-ethyl-N-i-amyl amino)-4-methyl-, spiro[5H-(1)benzopyrano(2,3-d) pyrimidine-5,1'(3'H) isobenzofuran]-3'-one,2-(di-n-butyl amino)-8-(di-n-butyl amino)-4-phenyl, 3-(2-methoxy-4-dimethylamino phenyl)-3-(1-butyl-2-methylindole-3-yl)-4,5,6,7-tetrachlorophtha-lide, 3-(2-ethoxy-4-diethyl amino phenyl)-3-(1-ethyl-2-methylindole-3-yl)-4,5,6,7-tetrachlorophthalide, 3-(2-ethoxy-4-diethyl amino phenyl)-3-(1-pentyl-2-methylindole-3-yl)-4,5,6,7-tetrachlorophthalide, etc.

In addition, the thermochromic composition may further include pyridine-based compounds, quinazoline-based compounds, and bisquinazoline-based compounds.

The content of the phase change material included in the thermochromic micro particles may be 10 wt % to 70 wt %, or 20 wt % to 70 wt % on the basis of a weight of the thermochromic micro particles. Accordingly, the thermochromic micro particles allow for the phase change zone in which a solid phase and a liquid phase of the phase change material coexist to widen, such that it is easy to maintain a chromogenic state and a decolorization state before and after the color-change, respectively.

A diameter of the thermochromic micro particle may be 0.1 μm to 10 μm. When the diameter of the thermochromic micro particle is excessively increased to be more than 10 μm, dispersion stability at the time of being applied to an ink, etc., may be reduced. On the contrary, when the diameter of the thermochromic micro particle is excessively decreased to be less than 0.1 μm, it may be difficult to exhibit high concentration of chromogenic property.

The core part or the shell layer included in the thermochromic micro particles may further include an expansion agent or a contraction agent. The expansion agent or the contraction agent means a material capable of being expanded or contracted by external specific actions, and may be included in the core part or in the shell layer of the thermochromic micro particles or in both of the core part and the shell layer to increase or decrease the diameter of the thermochromic micro particles. As described above, the size of the thermochromic micro particles may be modified according to temperature, such that it is easy to reversibly or irreversibly control a chromogenic concentration of the thermochromic micro particles above a specific temperature, thereby implementing excellent chromogenic property.

Examples of the expansion agent are not significantly limited, and for example, may include a low-boiling organic solvent. The low-boiling organic solvent is a solvent of which a boiling point is 90° C. or less, or 80° C. or less, and for example, may include isobutane (boiling point: about −11.7° C.), pentane (boiling point: about 36° C.), petroleum ether (boiling point: about 30 to 70° C.), hexane (boiling point: about 69° C.), etc. The low-boiling organic solvent may be easily volatilized when being heated, to generate gas, such that the thermochromic micro particles may be expanded.

Examples of the contraction agent are not significantly limited, and for example, may include a polymer electrolyte (polyelectrolyte). The polyelectrolyte means a polymer having a charge, and includes a repeating unit containing an ionic functional group or an ionizable functional group, and may change a form of the polymer chain by a degree of dissociation of a dissociation group or an ionic strength of a solvent.

The polyelectrolyte includes all of cationic polyelectrolyte and anionic polyelectrolyte. Examples of the cationic polyelectrolyte may include poly(diallyldimethylammonium chloride) (PDADMA-Cl); poly(N,N-dimethyl-3,5-dimethylene piperidinium chloride); poly(ethylenimine) (PEI); poly(vinylamine) (PVAH); poly(N-methyl vinylamine); poly(allylamine) (PAH); poly (4-vinyl-1-methylpyridinium bromide); poly(allylammonium fluoride); poly(dimethylamine-co-epichlorohydrin); poly(lysine); poly(N,N,N',N'-tetramethyl-N-trimethylenehexamethylenediammonium dibromide); poly (2-(dimethylamino-ethyl)methacrylate); poly (2-methacryloyloxy-ethyl-trimethylammonium chloride); poly (2-hydroxy-3-methacryloxypropyl-trimethylammonium chloride); poly (3-chloro-2-hydroxypropyl-2-methacryloxyethyl-dimethylammonium chloride), (PCHPMEDMAC); poly (N-[3-(dimethylamino)-propyl methacrylamide]); and poly ([3-methacryloylamino-propyl]-trimethylammonium chloride), etc. Examples of the anionic polyelectrolyte may include poly(acrylic acid) (PAA); poly(methacrylic acid) (PMA); poly(itaconic acid); poly (4-styrenesulfonic acid) (PSS); poly(vinylphosphonic acid); poly(vinylsulphonic acid); poly(aspartic acid); poly (glutamic acid); poly(sodium 4-styrene sulfonate) (NaPSS); poly(anetholesulfonic acid); poly (3-sulfopropyl methacrylate); poly (1,4-phenylene ether-sulfone sulfonic acid); or poly (1,4-phenylene ether ketone sulfonic acid), etc.

The thermochromic micro particles may include a core part including a phase change material and a dye. In addition, the thermochromic micro particles may include a shell layer including a polymer resin.

That is, the thermochromic micro particles may have a core-shell structure, and may have a form in which a mixture of the phase change material and the dye is impregnated into the polymer resin.

Examples of the polymer resin are not significantly limited, but various resins that are widely used in fields for manufacturing beads or microcapsules may be used without limitation. For example, melamine resins, urea resins, phenol resins, melamine-urea copolymers, melamine-phenol copolymers, and epoxy resins or mixtures of two or more thereof, etc., may be used.

Examples of a method for manufacturing the thermochromic micro particles are not significantly limited, and for example, an interfacial polymerization method, an in situ polymerization method of melamine-formalin-based, etc., an in-liquid curing coating method, a phase separation method from an aqueous solution, a phase separation method from an organic solvent, a soluble dispersion cooling method, an air suspension coating method, a spray drying method, etc., known in the art, may be used without limitation.

Meanwhile, according to another exemplary embodiment of the present invention, there may be provided a thermochromic ink composition including the thermochromic micro particles according to another exemplary embodiment.

The thermochromic ink composition may be prepared by using the thermochromic micro particles manufactured by the exemplary embodiment above as a pigment, and mixing a solvent, a resin, and other additives that are widely used in fields for preparing the existing ink composition.

Descriptions of the thermochromic micro particles include the contents described with respect to the exemplary embodiment above.

Examples of the solvent may include water, ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethyleneglycolmono methylether, ethyleneglycolmono ethylether, ethyleneglycolmono butylether, diethyleneglycolmono methylether, diethyleneglycolmono ethylether, diethyleneglycolmono butylether, propyleneglycol monobutyl ether, ethyleneglycolmono methylether acetate, sulfolane, 2-pyrrolidone, N-methyl-2-pyrrolidone, etc.

Examples of the resin may include ketone resins, ketone formaldehyde resins, amide resins, alkyd resins, rosin-modified resins, rosin-modified phenol resins, phenol resins, xylene resins, polyvinyl pyrrolidone, α- and β-pinene-phenol polycondensation resins, polyvinyl butyral resins, acrylic resins, styrene-maleic acid copolymers, cellulose derivatives, polyvinyl pyrrolidone, polyvinyl alcohol, dextrin, etc.

In addition, as other additives, moisturizers, thickeners, surfactants, preservatives, or mixtures of two or more thereof, may be used.

Examples of the moisturizer may include oligosaccharides such as urea, glycerin, a non-ionic surfactant, reducing or non-reducing starch hydrolyzate, trehalose, sucrose, cyclodextrin, glucose, dextrin, sorbit, mannite, sodium pyrophosphate, etc.

Examples of the thickener (or shear-thinning tackifier) may includeDeletedTextsxanthan gum, wellan gum, succinoglycan which is a heteropolysaccharide modified with an organic acid having, as a constituent monosaccharide, glucose and galactose (an average molecular weight of about 100 to 8,000,000), alcagum, guar gum, locust bean gum, and derivatives thereof, hydroxy ethylcellulose, alginic acid alkyl esters, a polymer including alkyl esters of methacrylic acid as a main component and having a molecular weight of 100,000 to 150,000, glucomannan, polysaccharide thickeners having a gelation ability and extracted from seaweeds e.g., agar, carrageenin, etc., benzylidene sorbitol and benzylidene xylitol or derivatives thereof, crosslinking acrylic acid polymers, inorganic particulates, polyglycerin fatty acid esters, polyoxyethylene sorbitan fatty acid esters, polyethylene glycol fatty acid esters, polyoxyethylene castor oil, polyoxyethylene lanolin.lanolinDeletedTextsalcoholDeletedTextsbeeswax derivatives, polyoxyethylene alkyl ether-.polyoxypropylenealkyl ethers, polyoxyethylenealkyl phenyl ethers, non-ionic surfactants having an HLB of 8 to 12, e.g., fatty acid amide, salts of dialkyl- or dialkenyl-sulfosuccinic acid, mixtures of N-alkyl-2-pyrrolidone and an anionic surfactant, and mixtures of polyvinyl alcohol and an acrylic resin.

In addition, examples of the surfactant may include higher fatty acids such as oleic acid, etc., non-ionic surfactants having a long-chain alkyl group, polyether-modified silicone oils, thiophosphite triesters such as tri(alkoxycarbonylmethylester) thiophosphite, tri(alkoxycarbonylethylester) thiophosphite, etc., phosphate monoesters of polyoxyethylenealkyl ether or polyoxyethylenealkyl aryl ether, phosphate diesters of polyoxyethylenealkyl ether or polyoxyethylenealkyl aryl ether, etc.

Examples of the preservative may include carbolic acid, sodium salt of 1,2-benz thiazolin-3-one, sodium benzoate, sodium dehydroacetate, potassium sorbate, propyl paraoxybenzoate, 2,3,5,6-tetrachloro-4-(methylsulfonyl)pyridine, etc.

Figure 5:
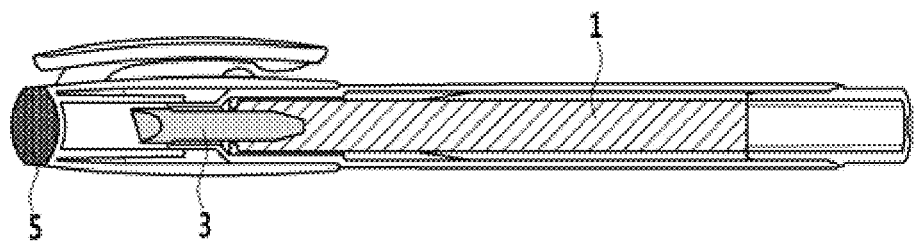
FIG. 5 shows a schematic structure of an absorption typed marking pen including the thermochromic ink composition of Example.

Meanwhile, according to another exemplary embodiment of the present invention, there may be provided a writing apparatus including an ink storage container filled with the thermochromic ink composition according to another exemplary embodiment above. Examples of the writing apparatus are not significantly limited, and for example, may include, as shown in FIG. 5, a cap type or a knock type writing tool 7 including an ink storage container 2, configured of the ink storage container 2, a ballpoint pen tip 3 installed in a tip end of the ink storage container 2, and a follower unit 4 together with an ink provided in a rear end of the thermochromic ink composition 1.

Figure 6:
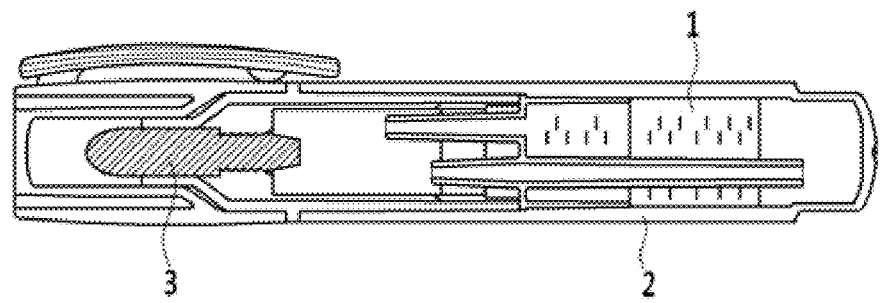
FIG. 6 shows a schematic structure of a direct liquid typed marking pen including the thermochromic ink composition of Example.

In addition, as shown in FIG. 6, a marking pen that stores the thermochromic ink composition 1 in an ink absorption body to be marked as a pen line may be used, or as shown in FIG. 7, a direct liquid type marking pen that directly stores the thermochromic ink composition 1 in the ink storage container 2, may also be used.

The thermochromic ink composition may be charged in the ink storage container of the writing apparatus. Examples of a method for filling the thermochromic ink composition in the writing apparatus are not significantly limited, and various methods that are widely used in manufacturing fields of the writing apparatus using an ink may be used without limitation.

In addition, the writing apparatus may further include a friction body or a heating element. The friction body means a material of causing appropriate friction at the time of scraping, to generate friction heat, and may be used to erase handwriting formed by the writing apparatus. Examples of the friction body are not significantly limited, and for example, may include elastic bodies such as elastomers, plastic foams, etc., plastic molded bodies, and metals.

Materials of the friction body may include a silicon resin or a SBS resin (a styrene butadiene styrene block copolymer), wherein the silicon resin is easily attached to a part that is erased by scraping, and has a tendency that the handwriting is bounced when repeatedly writing, such that the SBS resin may be more preferably used.

The heating element means a material that is supplied with power from a battery to generate heat, and may be used to erase the handwriting formed by the writing apparatus. Examples of the heating element are not significantly limited, and for example, may include material capable of generating heat by supply of electricity, such as a nichrome wire, etc.

The heating element may be directly used, but may be used in a form in which the heating element is surrounded with a cover. Examples of the cover are not significantly limited, and for example, may include rubber or various materials having thermal resistance and electrical insulation.

The friction body or the heating element does not significantly limit shapes of the writing apparatus, and may be positioned in a state in which the friction body or the heating element is coupled with the writing apparatus. As the friction body or the heating element is coupled with the writing apparatus, portability may be improved. More specifically, as shown in FIG. 5, the friction body or the heating element 5 may be coupled with a front end of a cap 6 or an end of shaft tube tip of the writing apparatus.

According to still another exemplary embodiment of the present invention, there may be provided a smart window including a coating layer in which the thermochromic micro particles according to the exemplary embodiment of the present invention are dispersed. Accordingly, in the smart window, colors may be changed depending on outside temperatures by the coating layer formed on a glass surface, such that transparency property of the glass may be changed to control an absorption degree of light or heat.

The description of the thermochromic micro particles includes the above-described contents with respect to the exemplary embodiment of the present invention.

The coating layer may further include a binder resin to disperse the thermochromic micro particles and to easily form the coating layer through adhesion. Examples of the binder resin are not significantly limited, and for example, may include polyvinyl alcohol-based resins, polyurethane-based resins, polyester-based resins, acrylic resins, etc. Various polymer resins that are widely used in fields for manufacturing coating layers may be used without limitation, in addition to the above-described examples of the binder resin.

An example of a method for forming the coating layer on the smart window may include a method of applying the binder resin in which the thermochromic micro particles are dispersed on a window surface.

According to the present invention, there may be provided the thermochromic ink composition capable of stably implementing a high chromogenic property and a decolorization property and having an improved erasing property, thermal resistance, and chemical resistance, and particles, an ink, a writing apparatus, and a smart window using the same.

Hereinafter, the present disclosure will be explained in detail with reference to the following examples. However, these examples are only to illustrate the inventive concept, and the scope of the inventive concept is not limited thereto.

Examples 1 to 2: Preparation of Thermochromic Micro Particle and Ink Composition Example 1

(1) Manufacture of Thermochromic Micro Particle

Lauryl gallate as a solvent was mixed with a lactone-based dye (crystal violet lactone) (1 g). Then, an epoxy compound as a wall film material was subjected to emulsification dispersion in 8% polyvinyl alcohol aqueous solution to form micro water droplets, and diethylenetriamine was added thereto, followed by continuously stirring at 70° C.

for about 5 hours to obtain a suspension. Then, the suspension was centrifuged to obtain thermochromic micro particles.

(2) Preparation of Thermochromic Ink Composition

A thermochromic ink composition was obtained by mixing 10 wt % of the thermochromic micro particles, 10 wt % of glycerin as a moisturizer, 0.5 wt % of xanthan gum as a thickener, 1 wt % of phosphoric acid ester-based surfactant (PHOSPHANOL RS-410, Japan, Toho Chemical Industry Co., Ltd), 65 wt % of water, and 0.3 wt % of Proxel XL-2 as a preservative, and dissolving and dispersing the mixture.

Example 2

(1) Manufacture of Thermochromic Micro Particles 4-alkoxy-4'-hydroxybiphenyl as a solvent was mixed with a lactone-based dye (crystal violet lactone) (1 g). Then, KER 828 (epoxy resin, Kumho P&B Chemicals., INC.) as a wall film material was subjected to emulsification dispersion in 8% polyvinyl alcohol aqueous solution to form micro water droplets, and A-053 (Kukdo Chemical Co., Ltd.) as a curing agent was added thereto, followed by continuously stirring at 70° C. for about 5 hours to obtain a suspension. Then, the suspension was centrifuged to obtain thermochromic micro particles.

(2) Preparation of Thermochromic Ink Composition

A thermochromic ink composition was obtained by mixing 10 wt % of the thermochromic micro particles, 10 wt % of glycerin as a moisturizer, 0.5 wt % of xanthan gum as a thickener, 1 wt % of phosphoric acid ester-based surfactant (PHOSPHANOL RS-410, Japan, Toho Chemical Industry Co., Ltd), 65 wt % of water, and 0.3 wt % of Proxel XL-2 as a preservative, and dissolving and dispersing the mixture.

Comparative Examples 1 to 3: Preparation of Thermochromic Micro Particles and Ink Composition Comparative Example 1

(1) Manufacture of Thermochromic Micro Particles

Thermochromic micro particles were obtained in the same method as Example 1 above except for using 1-hexanol only as a solvent.

(2) Preparation of Thermochromic Ink Composition

Thermochromic ink composition was obtained in the same method as Example 1 above.

Comparative Example 2

(1) Manufacture of Thermochromic Micro Particles

Thermochromic micro particles were obtained in the same method as Example 1 above except for using myristyl stearate as a solvent.

(2) Preparation of Thermochromic Ink Composition

Thermochromic ink composition was obtained in the same method as Example 1 above.

Comparative Example 3

(1) Manufacture of Thermochromic Micro Particles

Thermochromic micro particles were obtained in the same method as Example 1 above except for using butyl stearate only as a solvent.

(2) Preparation of Thermochromic Ink Composition

Thermochromic ink composition was obtained in the same method as Example 1 above.

Experimental Example

1. Crystallization Temperature and Melting Temperature

With respect to the thermochromic micro particles obtained by Examples and Comparative Examples, a crystallization temperature and a melting temperature thereof were measured by using a differential scanning calorimetry (DSC), and results thereof were shown in Table 1 below.

2. Phase Change Characteristic

With respect to the thermochromic micro particles obtained by Examples 1 and 2, phase composition thereof according to fraction ($X_{pha}$) of the phase change material was measured, and results thereof were shown in FIG. 1.

As shown in FIG. 1, the thermochromic micro particles of Example had a crystallization temperature between −10° C. and −5° C., and a melting point of 50° C. or more. Accordingly, it could be confirmed that the chromogenic property of the thermochromic micro particles disappeared above 50° C., and the thermochromic micro particles were colorless. The phase change characteristic was caused by the phase change material included in the thermochromic micro particles, which could be confirmed that the color-change temperature range of the dye was controlled by the phase change material.

In addition, it was confirmed that two phases including a solid phase and a liquid phase coexisted on the basis of a boundary surface shown as the curved line in the graph of FIG. 1, and an interval of the phase change zone was maximum at an inflection point fraction ($X_{pha}$), such that an effect of maintaining a chromogenic property and a decolorization property was increased.

3. Surface Shape

The surface shape of the thermochromic micro particles obtained by Example 1 was confirmed through FE-SEM, and results thereof were shown in FIG. 2 below.

Figure 2:
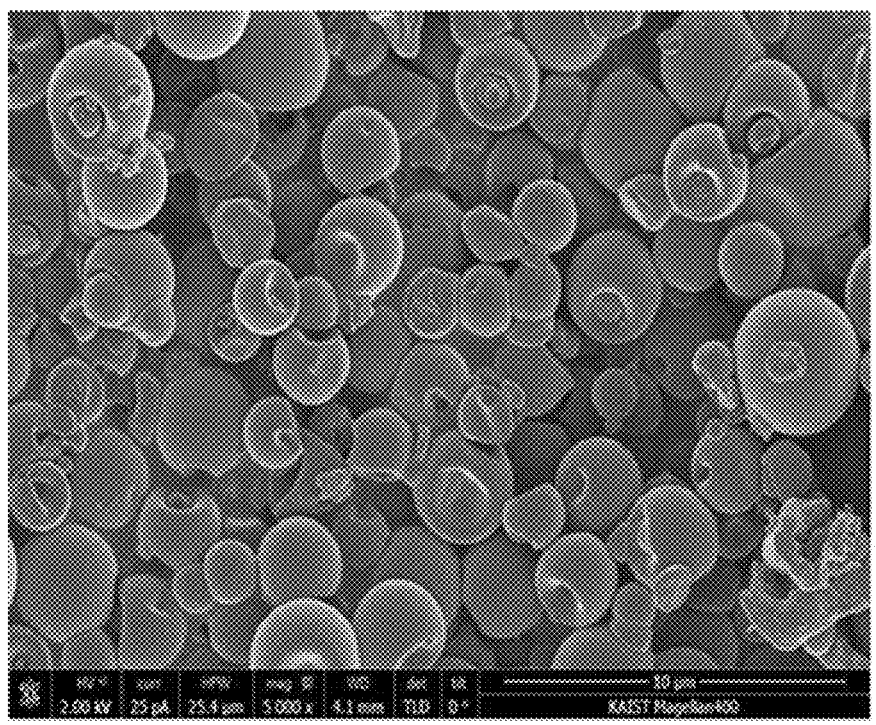
FIG. 2 shows a SEM image of a surface of the thermochromic micro particles manufactured by Example 1.

As shown in FIG. 2 below, it could be confirmed that the thermochromic micro particles obtained by Example 1 had a spherical particle shape having a diameter of 0.1 μm to 10 μm.

4. Thermochromism Property

Figure 3:
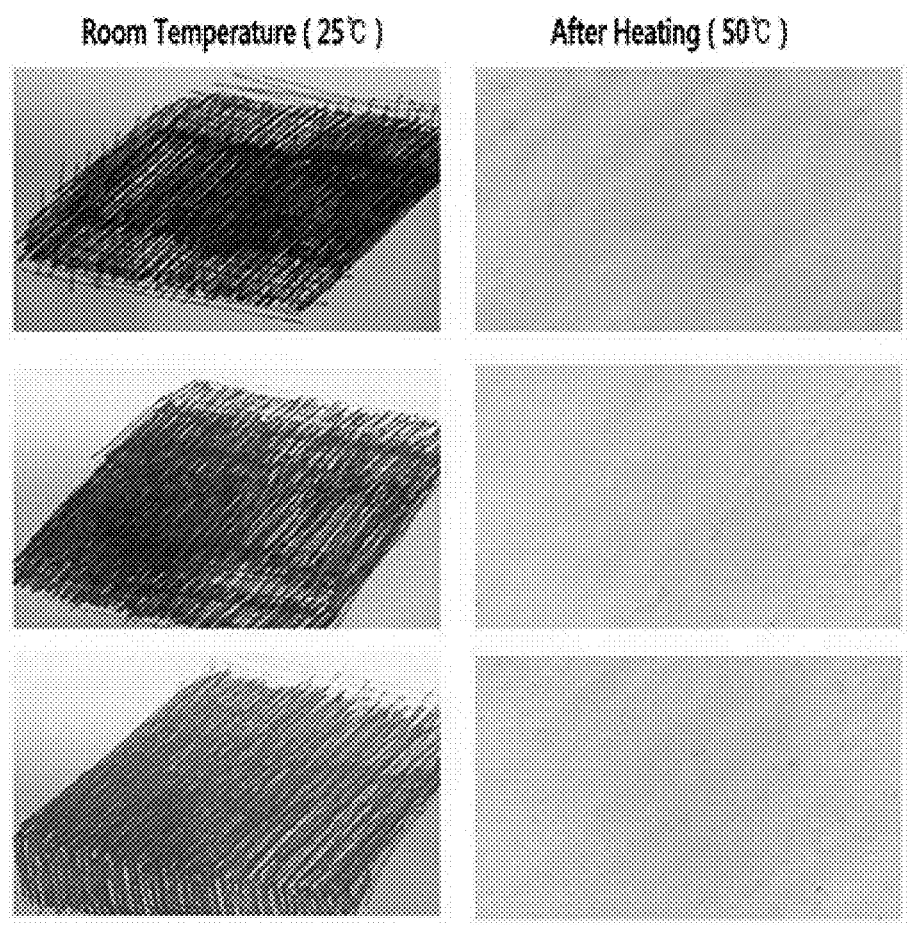
FIG. 3 shows a thermochromic characteristic of a thermochromic ink composition of Example.
Figure 4:
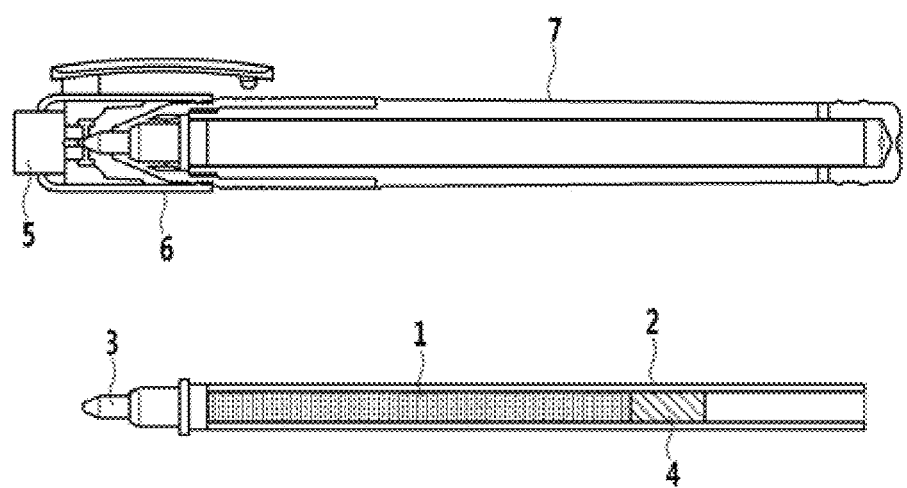
FIG. 4 shows a schematic structure of a cap typed writing apparatus or a knock typed writing apparatus, including the thermochromic ink composition of Example.

The thermochromic ink compositions obtained by Examples and Comparative Examples were used to draw images on a paper at room temperature as shown in FIG. 3 below, followed by heating at a temperature of 50° C., and a change of image was observed. Results thereof were evaluated under the following criteria and shown in Table 1 below.

TABLE 1

| Classification | Crystallization temperature (° C.) | Melting temperature (° C.) | Thermochromism property | Color-change temperature range |
|---|---|---|---|---|
| Example 1 | −10 | 65 | ◎ | 75 |
| Example 2 | −15 | 75 | ◎ | 90 |
| Comparative Example1 | — | 30-35 | X | — |
| Comparative Example2 | 50 | 55 | Δ | 5 |

TABLE 1-continued

| Classification | Crystallization temperature (° C.) | Melting temperature (° C.) | Thermochromism property | Color-change temperature range |
|---|---|---|---|---|
| Comparative Example3 | — | 30-35 | X | — |

◎: The image was completely erased after being heated to a temperature of 50° C.
Δ: The image was partially erased and non-erased parts remained after being heated to a temperature of 50° C.
X: The image was not erased after being heated to a temperature of 50° C.

As shown in Table 1 above, it could be confirmed that the images drawn at room temperature by using the thermochromic ink compositions of Examples were completely erased after being heated to a temperature of 50° C., and had excellent thermochromism property.

On the contrary, it could be confirmed that as to Comparative Examples without using the phase change material, the crystallization temperature or the melting temperature was not measured in Comparative Examples 1 to 3, such that the thermochromism property itself was not implemented. Further, the color-change temperature range was below 50° C. in Comparative Example 2, such that sufficient thermochromism property was not implemented.

As described above, it could be confirmed that the thermochromic ink compositions of Examples maintained excellent chromogenic property at room temperature, and had a color-change at between room temperature and 50° C., thereby being rapidly erased by friction heat, etc., with an eraser.

What is claimed is:

1. Thermochromic micro particles comprising:
a core part including a phase change material and a dye, the phase change material including a phenol-based compound containing an aliphatic functional group having a carbon number of 6 or more; and
a shell layer including a polymer resin;
wherein the phase change material and the dye are impregnated into the polymer resin;
the phenol-based compound containing an aliphatic functional group having a carbon number of 6 or more includes a compound represented by Chemical Formula 1:

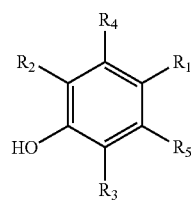

[Chemical Formula 1]

wherein,
$R_1$ is an aromatic functional group combined with an aliphatic functional group having a carbon number of 6 or more represented by Chemical Formula 3:

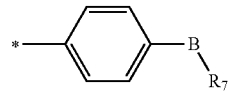

[Chemical Formula 3]

wherein,
$R_7$ is a straight chain or branched chain alkyl group having a carbon number of 6 to 20; and
B is an oxygen; and
$R_2$ to $R_5$ are each independently a hydroxy group or hydrogen.

2. The thermochromic micro particles of claim 1, wherein:
a color-change temperature range defined by General Formula 1 below is 50° C. or more:

Color-change temperature range (ΔT)=an absolute value of a difference between a melting point of the phase change material and a crystallization temperature of the phase change material. [General Formula 1]

3. The thermochromic micro particles of claim 2, wherein:
the crystallization temperature of the phase change material is −20° C. to 0° C.

4. The thermochromic micro particles of claim 2, wherein:
the melting point of the phase change material is 30° C. or more.

5. The thermochromic micro particles of claim 1, wherein:
a content of the phase change material on the basis of a weight of the thermochromic micro particles is 10 wt % to 70 wt %.

6. The thermochromic micro particles of claim 1, wherein:
the dye is a lactone-based dye.

7. The thermochromic micro particles of claim 6, wherein:
the lactone-based dye includes a phthalide-based compound or a fluoran-based compound.

8. The thermochromic micro particles of claim 1, wherein:
a diameter of the thermochromic micro particle is 0.1 μm to 10 μm.

9. The thermochromic micro particles of claim 1, wherein:
the polymer resin includes at least one selected from the group consisting of melamine resins, urea resins, phenol resins, melamine-urea copolymers, melamine-phenol copolymers, and epoxy resins.

10. The thermochromic micro particles of claim 1, wherein:
the core part or the shell layer included in the thermochromic micro particles further includes an expansion agent or a contraction agent.

11. A thermochromic ink composition comprising the thermochromic micro particles of claim 1.

12. A writing apparatus comprising
an ink storage container filled with the thermochromic ink composition of claim 11.

13. The writing apparatus of claim 12, further comprising:
a friction.

14. A window comprising a coating layer in which the thermochromic micro particles of claim 1 are dispersed.

* * * * *